United States Patent [19]

von Arndt et al.

[11] Patent Number: 5,630,980
[45] Date of Patent: May 20, 1997

[54] PROCESS OF MAKING A SEAL WITH GROOVED SURFACE

[75] Inventors: Ernst-Moritz von Arndt, Weinheim; Günter Stein, Hemsbach, both of Germany

[73] Assignee: Firma Carl Freudenberg, Germany

[21] Appl. No.: 550,425

[22] Filed: Oct. 30, 1995

Related U.S. Application Data

[62] Division of Ser. No. 308,857, Sep. 19, 1994, Pat. No. 5,507,505.

[30] Foreign Application Priority Data

Sep. 30, 1993 [DE] Germany .................. 43 33 244.7

[51] Int. Cl.$^6$ .................................................. B29C 35/08
[52] U.S. Cl. ................................. 264/400; 264/154
[58] Field of Search .............................. 264/154, 400; 83/875; 219/121.69, 121.72, 121.85

[56] References Cited

FOREIGN PATENT DOCUMENTS 2153503  5/1973  Germany ........................... 264/154

*Primary Examiner*—Leo B. Tentoni
*Attorney, Agent, or Firm*—Kenyon & Kenyon

[57] ABSTRACT

A rod or piston seal with a seal body made of a polymeric material, which contacts the surface that is being sealed and is capable of relative displacement with a sealing surface. The sealing surface is interrupted in the movement direction by at least two grooves, extending in the peripheral direction, that have a spacing between them. The spacing consists of at least one land that extends in the axial direction between the mutually adjacent grooves, such that the ratio A between the width of the land and the width of the grooves in the movement direction is 1:2 to 200:1, the ratio B between the width and depth of the grooves is 10:1 to 1:5, and the depth of the grooves has a value of 1 to 200 μm.

3 Claims, 2 Drawing Sheets

PROCESS OF MAKING A SEAL WITH GROOVED SURFACE

This application is a division of application Ser. No. 08/308,857, filed on Sep. 19, 1994, now U.S. Pat. No. 5,507,505.

BACKGROUND OF THE INVENTION

1. Field of the Invention

The present invention concerns a rod or piston seal with a seal body made of a polymeric material, which seal body contacts the surface that is being sealed, and is capable of relative displacement. The seal has a sealing surface that is interrupted in the movement direction by at least two grooves, extending in the peripheral direction, that have a spacing between them.

2. Description of the Prior Art

A seal is shown in EP 0 207 703 B1. The seal in this publication uses a sealing ring that is arranged in an annular groove of a housing and has two axially spaced lip sections. An O-ring-shaped elastomeric pressurizing element is provided in the radial direction on the side of the sealing ring facing away from the surface being sealed, and presses the sealing ring in a sealed manner against the surface being sealed. Provided between the lip sections is a peripheral land section that contacts the surface being sealed only when acted upon by pressure. The sealing ring can be made of polytetrafluoroethylene or polyurethane; the application ring is preferably made of rubber. The magnitude of the friction depends greatly on the force applied to the sealing ring and on the prevailing pressure, which can lead to functional impairments of the parts being sealed with respect to one another. The application ring exhibits relaxation effects over a long service life, which can cause leaks in the sealing arrangement.

BRIEF DESCRIPTION OF THE INVENTION

The underlying object of the invention is to develop further a rod or piston seal of the type described above in such a way that the aforementioned drawbacks are eliminated, that the seal has substantially reduced friction, and that low friction takes on values which are almost identical essentially irrespective of the magnitude of the prevailing pressure. This result is unexpected.

In the context of the present invention, provision is made for the spacing to consist of at least one land that extends in the axial direction between mutually adjacent grooves. The ratio A between the width of the land and the width of the grooves in the movement direction is 1:2 to 200:1. The ratio B between the width and depth of the grooves is 10:1 to 1:5. The depth of the grooves has a value of 1 to 200 µm. Such a configuration considerably reduces friction during a translational movement of the components being sealed with respect to one another. It is also significance that the frictional values have almost identically low values, essentially irrespective of the pressure acting on the seal. In a pressure range from 1 bar to 350 bars of relative positive pressure and with an identical medium being sealed, the average friction that has been measured over the entire displacement travel of the surfaces being sealed, irrespective of the pressure, was 0.5 to 1.5 daN—depending on the polymeric material used for the seal body. The friction for conventional rod or piston seals, on the other hand, depending on the prevailing pressure, is approximately 2 daN at 5 bars relative positive pressure and is as high as 8 daN at 80 bars. It is evident from these figures that the friction of conventional seals exhibits pressure-dependent values that they can differ by a factor of four over a relatively narrow pressure range and are comparatively high in absolute terms.

A further reduction in friction and a reduction in the variation in frictional values, to a value of 1 daN +/− 0.2 daN for sealed pressures of 1 to 350 bars, can be achieved if ratio A is 1.5:1 to 30:1 and ratio B is 2.1:1 to 3.8:1, and if the depth has a value of 7 to 35 µm. In terms of further improvement in sealing, it has proven advantageous if the width of the lands is greater than the width of the adjacent grooves. At a groove depth of 7 to 35 µm, excellent sealing effects can be achieved by the comparatively large width of the land and the capillarity-inducing narrowness of the grooves. Also, the lubricating medium enclosed in the groove is sufficient to lubricate the sealing surface as the seal moves, to minimize abrasive wear and ensure consistently good characteristics for the seal over a long service life.

The grooves adjacent to one another in the axial direction can have cross-sectional shapes or sizes differing from one another, and/or spacings differing from one another. By being optimized in this manner, the seal can be precisely adapted to the particular conditions of the application. For example, in order to ensure consistently good lubrication, along the entire axial extent of the seal body, between the sealing surfaces, provision can be made for the cross-sectional size of the groove closest to the medium being sealed—and the axial expansion of the lands that form the spacing between the grooves—to be greater than on the side of the seal facing away from the medium being sealed. Such a configuration allows the lands that are farther away from the space being sealed to be lubricated by a sufficient quantity of the medium being sealed, and that the medium used for lubrication is securely sealed inside the seal body with respect to the environment.

According to a preferred embodiment, the grooves are concentric in configuration, and sealing surface has at least ten grooves. The concentric lip shape can be produced easily in terms of both production engineering and economy, since tool production is substantially simplified by comparison with the production of a tool needed for producing spiral lips. Seals whose grooves are configured, for example, in a continuously spiral form can nevertheless be used to seal the component that exhibits relative reciprocal movement.

According to another advantageous embodiment, provision can be made for the land of the sealing surface to enclose, as manufactured, an angle with the moving surface that is 1 degree to 10 degrees, preferably 2 to 5 degrees; and for the angle to be open toward the space being sealed. When relative movement in translation of the two parts occurs, the position of the sealing surface relative to the surface being sealed produces good lubrication of the lands of the seal. In the latter range of 2 to 5 degrees, in particular, the result is both a good return flow of medium being sealed toward the space being sealed, and excellent static sealing because of the capillary effect between the surface being sealed and the sealing surface, when the parts are stationary with respect to one another.

The grooves can be arranged on the sealing surface of a grooved ring, a lip seal, or an O-ring seal. The seal can be utilized irrespective of the shape of the parts which move relative to one another, or the space available for installation of the seal. Preferably, however, the grooves are arranged on the sealing surface of grooved rings or lip seals, since in such cases the sealing surface is almost flat in the axial direction and the advantageous characteristics of the seal are thus most effective.

The grooves can have a profile that continues in a rounded-off fashion into the land of the sealing surface. The advantage of this configuration is that jamming effects and hence increased friction between the surfaces being sealed can be prevented, even if the surfaces of the components being sealed are not precisely machined but rather have ordinary, as-manufactured roughnesses. This embodiment is of particular significance in terms of cost-effective production of the parts being sealed. In addition, this embodiment of the seal body minimizes the risk of damaging the seal during assembly.

The grooves can have a substantially trapezoidal profile, so that the axial delimiting surfaces of the trapezoidal profile enclose an angle of 20 to 85 degrees, preferably 50 to 70 degrees, with the surface being sealed. The advantage of this embodiment is that the cross-sectional shape and size of the grooves remain largely unchanged during a long service life. If the angle were, for example, only approximately 10 to 20 degrees, minimal abrasive wear would result in critical narrowing of the grooves, critical enlargement of the width of the lands, and undesired increase in friction. If, on the other hand, the angle were 85 to 90 degrees, the wiping effect between the sealing surface and the surface being sealed would be too large, and as a result friction would become undesirably high between the lands and the surface being sealed. In an embodiment of this type, the transition from the delimiting surfaces of the trapezoidal profile into the groove base is particularly easy to round off. The rounded transition minimizes notch sensitivity at this point as well as the risk of incipient breakage, which is advantageous in terms of lower wear and longer service life with consistently good utilization characteristics.

The grooves can be generated by the action of a laser beam on the sealing surface of the seal body. The advantage of this method of fabrication is that precise geometrical dimensions of the grooves can be achieved. The grooves are burned into the surface of the sealing surface by the laser beam. The penetration depth can be controlled by the energy density of the laser beam, its pulse count, and the repetition rate of the beam.

The rod or piston seal according to the present invention can be used in the brake packing of a brake cylinder in a hydraulic braking system of a motor vehicle. For this application especially, the advantageous characteristics with respect to minimal friction independent of pressure are of particular advantage. As compared with conventional brake packings, the friction of the loaded seal of the present invention, in a brake packing application, is at most one-fifth of the previous friction.

BRIEF DESCRIPTION OF THE DRAWINGS

The rod or piston seal according to the invention will be explained further below with reference to the drawings, in which.

DETAILED DESCRIPTION OF THE DRAWINGS

Figure 1:
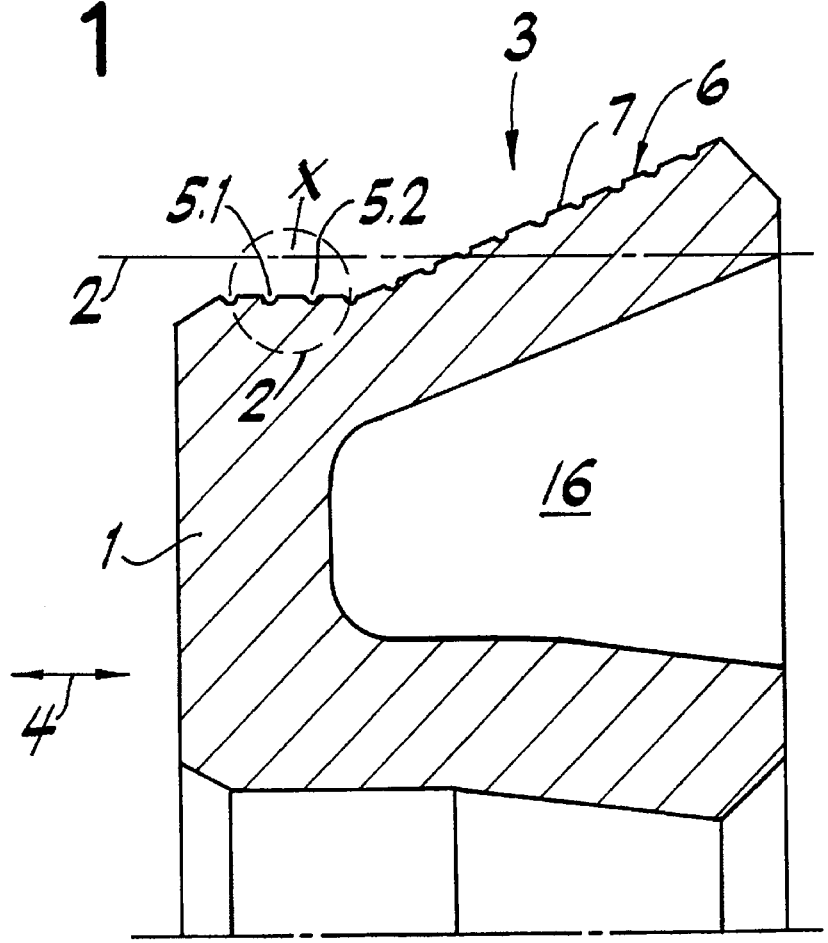
FIG. 1 shows an exemplary embodiment of the rod or piston seal in section.

FIG. 1 shows an exemplary embodiment of a rod or piston seal that is utilized as the brake packing of a master brake cylinder in the hydraulic braking system of a motor vehicle. In this exemplary embodiment, seal body 1 is made of an ethylene-propylene elastomer and reliably seals pressures up to 350 bar. Seal body 1 is shown in the uninstalled, as-manufactured state in FIG. 1; the surface 2 to be sealed, to which the seal is relatively displaced, is indicated schematically with a dot-dash line. Sealing surface 3 of seal body 1 has a plurality of grooves 5.1, 5.2, etc., extending in the peripheral direction and running concentrically, which are arranged with a spacing 6 between them and are separated from one another by lands 7. In the exemplary embodiment depicted in FIG. 1, ratio A between width 11 of land 7 and width 10 of grooves 5.1, 5.2, etc. in a movement direction 4 is between 1.5:1 and 30:1; ratio B between width 10 and depth 17 of the grooves is 2.1:1 to 3.8:1, and depth 17 lies within a range from 7 to 35 µm. During intended usage, i.e., when seal body 1 is installed, grooves 5.1, 5.2, etc. are arranged in a serial relationship. Because of the large number of grooves 5.1, 5.2, etc. and their arrangement along the entire axial extent of seal body 1 on the side facing surface 2 being sealed, excellent sealing results can be obtained during a long service life while retaining favorable frictional characteristics.

Figure 2:
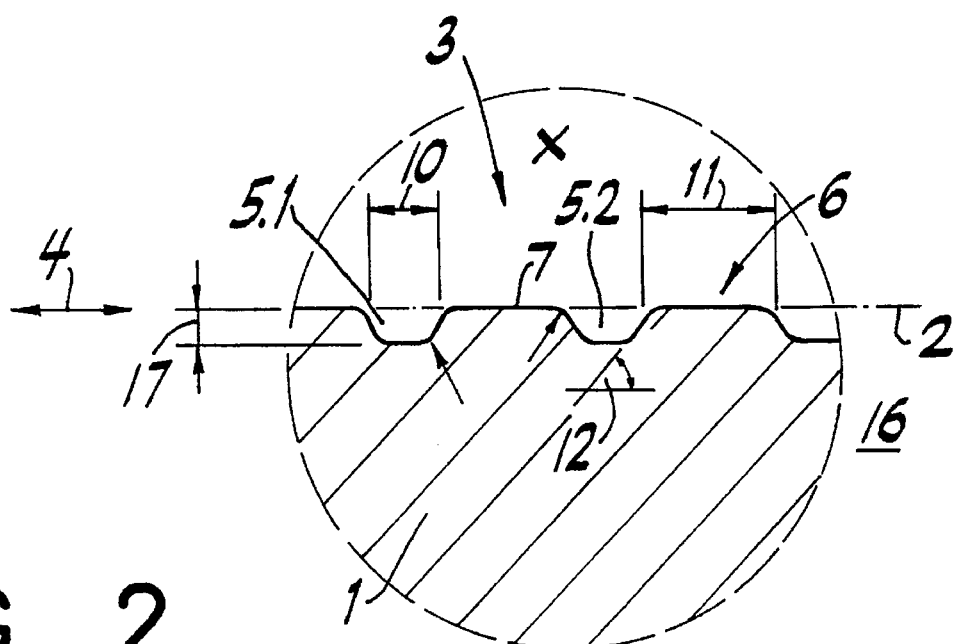
FIG. 2 shows a section of a first exemplary embodiment of the sealing surface of a rod or piston seal according to FIG. 1.

FIG. 2 shows a section of a first exemplary embodiment of seal body 1 from FIG. 1. In this exemplary embodiment, the mutually adjacent grooves 5.1, 5.2 each have a width 10 in the movement direction 4 of 45 µm, and a depth C of 17 µm. In this exemplary embodiment width 11 of land 7 is 90 µm. The groove base of grooves 5.1, 5.2 is rounded off, as is the transition to lands 7 of sealing surface 3. Grooves 5.1, 5.2 are trapezoidal in shape. The axial delimiting surfaces of the trapezoidal profile of grooves 5.1, 5.2 enclose an angle 12 of 60 degrees with surface 2 being sealed. In this exemplary embodiment, lands 7 are in planar contact with surface 2 being sealed.

Figure 3:
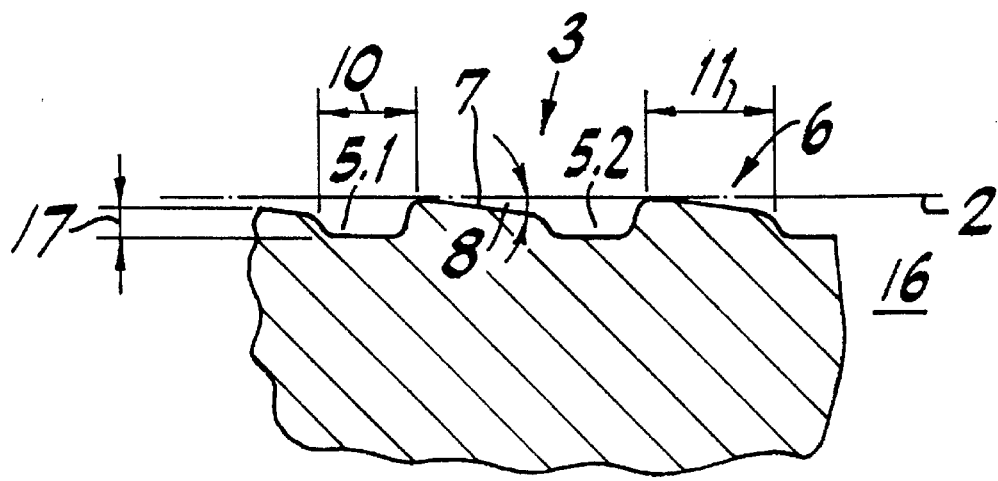
FIG. 3 shows a section of a second exemplary embodiment of the sealing surface of a rod or piston seal according to FIG. 1.

FIG. 3 shows a section of a second exemplary embodiment of the rod or piston seal according to the invention, similar to the exemplary embodiment of FIG. 2. As manufactured, lands 7 of sealing surface 3 enclose an angle 8, which in this exemplary embodiment is 5 degrees, with surface 2. In this exemplary embodiment the space being sealed is marked with reference number 16. Land 7 is configured as an inlet ramp for the medium being sealed, so that when a relative displacement of the surface being sealed occurs, in the direction of space 16 being sealed, fluid components of the medium being sealed are pushed by a sweeping force between surface 2 being sealed and lands 7 of sealing surface 3. In this exemplary embodiment, grooves 5.1, 5.2 have a depth 17 of 10 µm and a width 10 of 35 µm, while width 11 of lands 7 is 120 µm.

Figure 4:
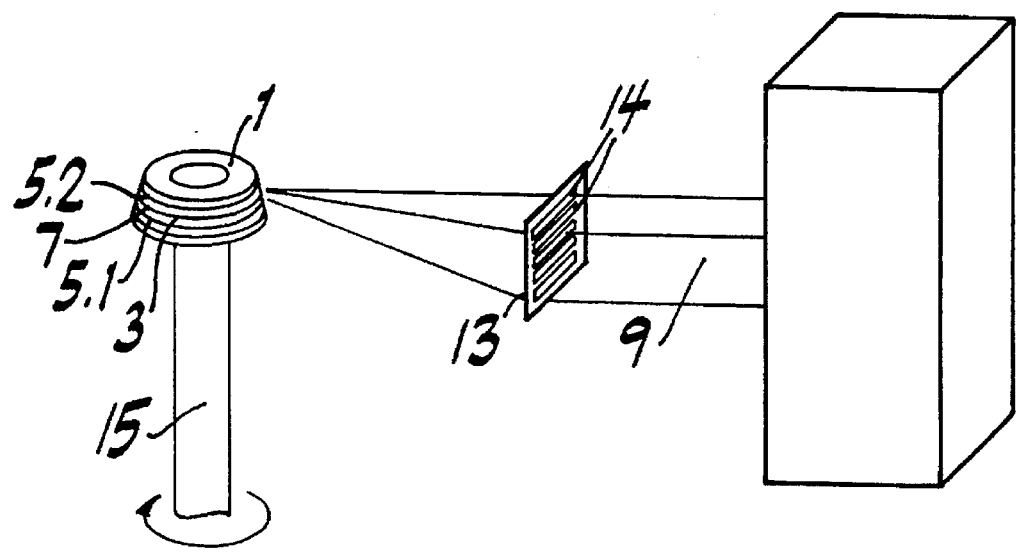
FIG. 4 shows an example of a method for introducing the grooves into the sealing surface.

FIG. 4 shows an arrangement for producing seal body 1 according to the present invention, which is configured as a brake packing. Using a high-energy excimer laser, fine fluting is burned into the surface of the seal body in its peripheral direction. After passing through a perforated mask 13, which in this example comprises five rectangular slits 14, the laser beam is imaged onto the sealing surface 3 by a suitable optical system. Fluting in the peripheral direction is burned in by rotation of seal body 1 placed on a mandrel 15. Groove depth C can be controlled via the energy density of laser beam 9, its pulse count, and the rate at which its action on seal body 1 is repeated.

We claim:

1. A method of manufacturing a seal comprising the steps of:

providing a seal body made of polymeric material and comprising a sealing surface;

providing a laser producing a laser beam;

passing said laser beam through a mask;

imaging said laser beam on said sealing surface after said step of passing said laser beam through a mask to thereby produce at least two grooves on said sealing surface.

2. The method of claim 1, wherein:

said step of passing said laser beam through a mask comprises passing said laser beam through a perforated mask comprising a plurality of rectangular slits.

3. The method of claim 1 further comprising the step of:

rotating said seal body during said step of imaging said laser beam on said sealing surface.

\* \* \* \* \*